P. M. STEWART.
PROTECTED METAL ARTICLE.
APPLICATION FILED OCT. 21, 1916.
1,288,734.
Patented Dec. 24, 1918.
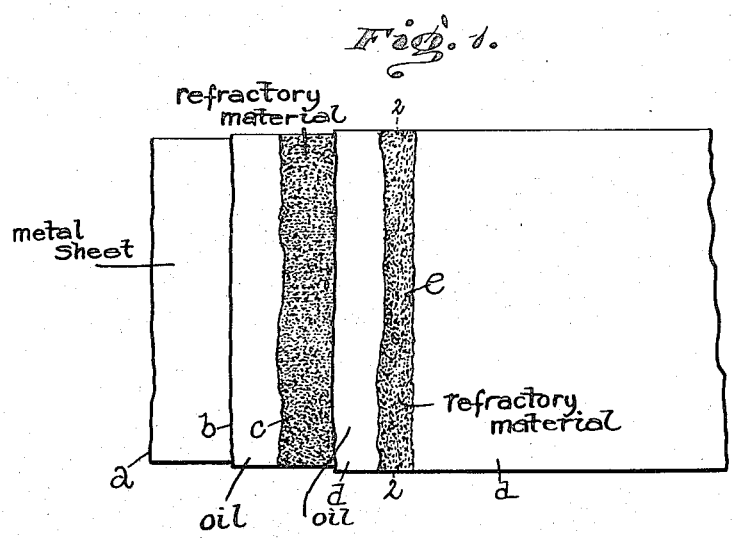
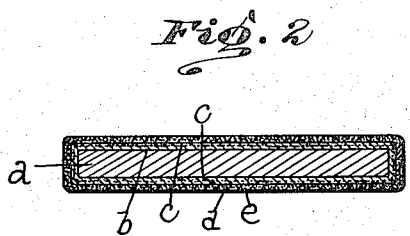
Inventor
Percy M. Stewart
by Jas. H. Churchill
atty.

UNITED STATES PATENT OFFICE.

PEREZ M. STEWART, OF NEW YORK, N. Y., ASSIGNOR TO GERTRUDE F. STEWART, OF NEW YORK, N. Y.

PROTECTED METAL ARTICLE.

1,288,734. Specification of Letters Patent. Patented Dec. 24, 1918.

Application filed October 21, 1916. Serial No. 127,029.

*To all whom it may concern:*

Be it known that I, PEREZ M. STEWART, a citizen of the United States, and a resident of the borough of Manhattan, in the city, county, and State of New York, have invented an Improvement in Protected Metal Articles, of which the following description, in connection with the accompanying drawings, is a specification, like characters on the drawings representing like parts.

This invention relates to a body or article protected against corrosion by acids, acid fumes, alkalis, and sunlight and moisture, and to a novel method of making the same.

The method employed is especially applicable for the protection of pieces or articles of steel or iron, and to facilitate description I shall hereinafter refer to the body or article as steel.

In accordance with this invention, the piece of steel, which may be of any shape, is given a coating of vegetable oil, preferably one that tends to dry by polymerization, such as Chinese wood oil, which may be effected in any suitable manner, as by dipping or immersing the steel in a bath of the oil, whereby all parts of the steel are incased in an oil film or layer.

The steel thus coated has applied to it a layer of material in a powdered or loosely divided state and capable of resisting the actinic rays of the sun, and preferably absorbent, such, for instance, as cement, infusorial earth, kieselghur clay, or any powder, filler or pigment which tends to retract the actinic rays of the sun.

This powdered layer is applied to the oil coating or layer when the latter is in a tacky condition, and is applied in sufficient quantity to form a protective layer of material in a loosely divided state, which is adhesively affixed to the steel by the coating of oil, and preferably by passing the coated body through a mass or body of the powdered material.

The loosely divided or powdered material adheres to the coating of oil and embeds itself therein more or less, but it is not designed to break through the oil coating or layer, but to leave the oil coating or layer continuous or intact so as to seal the steel against external influences and to make a body for additional layers to adhere to.

After the coating of oil to which the powdered material has been applied has hardened sufficiently, a second coating or layer, preferably one composed of the same oil in which is incorporated the same pigment or powder is applied in any suitable manner. The second coating with the pigment or powder incorporated therein protects the first coating or layer of oil and powdered material and waterproofs the same, and also protects the first layer of oil from bleaching, and said second coat of oil and powdered material naturally unites with the first layer of oil and powdered material, and if desired one or more additional coats or layers of oil and pigment or powdered material may be applied to the preceding layers.

If desired the coated article can be baked or heated so as to unite or flux the various layers of oil and powdered material and make a homogeneous protecting body for the article of steel, whereby a steel body or article is thoroughly protected at low cost against sunlight, moisture, acids, acid fumes, alkalis, and all the agents which tend to destroy the steel by corrosion or rust.

If desired, the initial layer or coating of oil may be baked on the steel or other article, and a second layer or coating of the oil may be applied to the baked layer, and the powdered or loosely divided material applied to the second layer of oil while the latter is in a tacky condition.

I may prefer to use a vegetable oil alone, preferably one that tends to dry by polymerization, such as Chinese wood oil, or such oil having added thereto a small per cent. of burnt alum in a heated condition, but it is not desired to limit the invention in this respect, as other oily or like substances, such as other oils, gums, resins, waxes, asphalts, coal tar or its derivatives may be incorporated with the vegetable oil. The powdered or loosely divided material which is capable of or tends to refract the actinic rays of the sun, and which is preferably absorbent, is used in sufficient quantity to form a protective layer, which is adhesively attached to all parts or surfaces of the article by the vegetable oil.

The article of steel may and preferably will be cleansed in the usual manner to remove surface impurities, such as scale, etc., and may be heated to dispel moisture and place the steel in the best condition to receive the coating of vegetable oil.

The powdered or loosely divided material may and preferably will be heated to expel moisture and place it in the best condition to absorb oil.

Figure 1 represents a protected article embodying the invention, and

Fig. 2, a section on the line 2—2, Fig. 1.

Referring to the drawing, a represents the body or article to be protected; b, the layer of Chinese wood or other vegetable oil alone or having incorporated with it burnt alum or other oils, gums, coal tar derivatives, etc.; c, the layer of material refractory to the actinic rays of the sun and in a powdered or loosely divided state, which is represented by dots or stipple; d, the second layer of oil; and e, the second layer of refractory material.

The protective coatings above described, are especially advantageous for use on articles or pieces of steel, as the latter can be provided with the protective coatings in the steel mill and shipped therefrom to the job in a finished condition ready for use, or the first coating or layer of oil can be applied at the steel mill, and the additional layers applied on the job, and in the transportation from the mill to the job, the steel article is protected by the first layer or coating, which seals the steel article before rust or corrosion can take place.

It will also be observed that the steel may be protected at a very low cost.

The above process of protecting steel or other bodies is especially valuable for protecting steel in the form of laths, wire woven fences, and any body or article which has irregular surfaces and openings therein.

Claim:

As a new article of manufacture, a metal body provided with a layer of oil enveloping said body, and finely divided opaque mineral material having its particles embedded in and directly affixed to said layer of oil over the entire surface area of said metal body to form a protective layer for excluding from said layer of oil the actinic rays of the sun.

In testimony whereof I have signed my name to this specification.

PEREZ M. STEWART.